(12) United States Patent
Silsby et al.

(10) Patent No.: US 12,065,210 B2
(45) Date of Patent: Aug. 20, 2024

(54) STORAGE ASSEMBLY FOR A CARGO BICYCLE

(71) Applicant: Rad Power Bikes Inc., Seattle, WA (US)

(72) Inventors: Jake Silsby, Seattle, WA (US); Joe Gray, Seattle, WA (US); Matthew Arksey, Seattle, WA (US); Trevor Knapp, Seattle, WA (US); Jed McCann, Seattle, WA (US)

(73) Assignee: Rad Power Bikes Inc., Seattle, WA (US)

( * ) Notice: Subject to any disclaimer, the term of this patent is extended or adjusted under 35 U.S.C. 154(b) by 30 days.

(21) Appl. No.: 17/535,057

(22) Filed: Nov. 24, 2021

(65) Prior Publication Data

US 2023/0159122 A1 May 25, 2023

(51) Int. Cl.
*B62J 9/26* (2020.01)
*B62J 9/24* (2020.01)

(52) U.S. Cl.
CPC .. *B62J 9/26* (2020.02); *B62J 9/24* (2020.02)

(58) Field of Classification Search
CPC ......... B62J 9/24; B62J 9/26; B62J 9/27; B62J 9/23; B62J 7/08; B62J 7/04
USPC ......................................... 224/430, 441–442
See application file for complete search history.

(56) References Cited

U.S. PATENT DOCUMENTS

| | | | | | |
|---|---|---|---|---|---|
| 2,776,790 | A | * | 1/1957 | Zbikowski | B62J 7/02 224/430 |
| 5,435,471 | A | * | 7/1995 | Chuang | B62J 9/27 224/419 |
| 6,499,638 | B2 | * | 12/2002 | Campbell | B62J 9/27 224/430 |
| 7,311,232 | B2 | * | 12/2007 | Watanabe | B62J 9/27 224/430 |
| 8,646,669 | B2 | * | 2/2014 | Mann | B62J 7/08 224/419 |
| 9,428,234 | B2 | * | 8/2016 | Bopanna | B62J 9/23 |
| 10,308,305 | B2 | * | 6/2019 | Iwata | B62J 9/23 |
| 2008/0272165 | A1 | * | 11/2008 | McMillan | B60R 9/12 224/408 |
| 2021/0347431 | A1 | * | 11/2021 | Visenzi | B62J 7/08 |

* cited by examiner

*Primary Examiner* — Adam J Waggenspack
(74) *Attorney, Agent, or Firm* — AMPACC Law Group, PLLC

(57) ABSTRACT

A storage assembly, including hard cases and associated mounting brackets, for a bicycle, such as an electric cargo bicycle, is described. The storage assembly, in some embodiments, includes hard case panniers, rear boxes, and other hard case storage apparatus. Further, the storage assembly can include mounting brackets, such as brackets configured to mount various hard cases to a rear rack of the cargo bicycle in various configurations.

11 Claims, 13 Drawing Sheets

STORAGE ASSEMBLY FOR A CARGO BICYCLE

BACKGROUND

Electric bicycles, or e-bikes, are a popular method of transportation for use by individual riders, families, commercial enterprises and fleets, and so on. Unlike traditional bikes, an e-bike provides assisted modes of travel to a rider, including a peddle assist mode that utilizes power from a motor to assist the rider in pedaling and/or a throttle mode where the motor, when engaged, powers the e-bike without any pedaling from the rider.

Certain electric bicycles, such as cargo bicycles, provide riders with racks and other accessories that facilitate the hauling of cargo and the carrying of children. For example, a cargo bicycle, either electric or conventional, can include a rear rack mounted behind the seat of the bicycle, which supports additional seating (e.g., child seats), and the attachment of cargo, support pads, boxes, baskets, panniers, and so on.

BRIEF DESCRIPTION OF THE DRAWINGS

Embodiments of the present technology will be described and explained through the use of the accompanying drawings.

Figure 1:
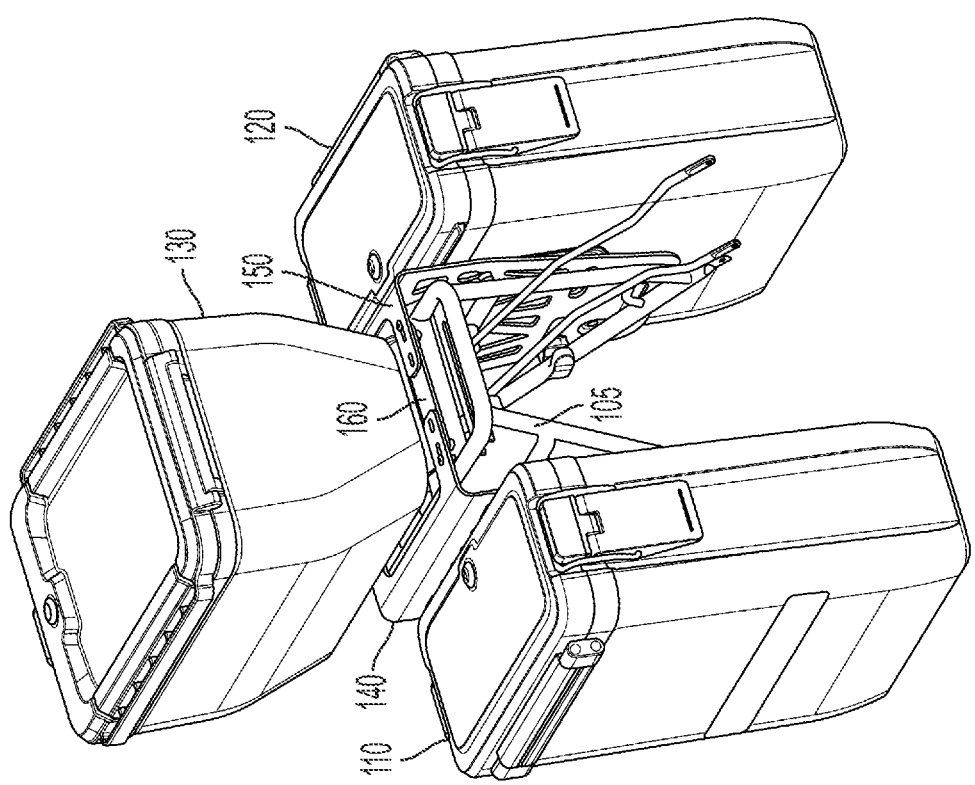
FIG. 1 is a diagram of a storage assembly for a cargo bike, such as an electric cargo bike.

In the drawings, some components are not drawn to scale, and some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

Overview

A storage assembly, including hard cases and associated mounting brackets, for a bicycle, such as an electric cargo bicycle, is described. The storage assembly, in some embodiments, includes hard case panniers, rear boxes, and/or other hard case storage apparatus. Further, the storage assembly can include mounting brackets, such as brackets configured to mount various hard cases to a rear rack of the cargo bicycle.

For example, the mounting brackets can include openings or other holes that are placed or disposed in areas of the brackets that facilitate the flexible and/or interchangeable mounting of cases (e.g., panniers) at different positions on the rear rack (such as in a forward position and/or rear position), on different sides of the rear rack, and in combination with other cases (e.g., a rear box) mounted to a top area of the rear rack.

Thus, the storage assembly, in some embodiments, provides mounting brackets that enable various mounting or attachment configurations of hard cases to the rear rack of the bicycle, among other benefits.

While described herein with respect to an electric bicycle or a cargo bicycle, in some embodiments, aspects of the cases and brackets described herein can be configured or utilized with other bicycles or cycles, electric scooters or other wheeled micro-mobility vehicles, mopeds, or vehicles having suitable storage racks, and so on.

Various embodiments will now be described. The following description provides specific details for a thorough understanding and an enabling description of these embodiments. One skilled in the art will understand, however, that these embodiments may be practiced without many of these details. Additionally, some well-known structures or functions may not be shown or described in detail, so as to avoid unnecessarily obscuring the relevant description of the various embodiments. The terminology used in the description presented below is intended to be interpreted in its broadest reasonable manner, even though it is being used in conjunction with a detailed description of certain specific embodiments.

Examples of the Storage Assembly

As described herein, the storage assembly can include multiple different hard cases and associated brackets that combine to provide storage to a cargo bicycle, such as an electric cargo bicycle. Details regarding a suitable cargo bicycle can be found in U.S. patent application Ser. No. 16/872,059, filed on May 11, 2020, entitled "Frame for an Electric Cargo Bicycle", which is hereby incorporated by reference in its entirety.

FIG. 1 is a diagram of a storage assembly 100 for a cargo bike or bicycle, such as an electric cargo bike or e-bike. The storage assembly 100 is mounted, fixed, and/or attached to a rear rack 105 of a bicycle. The rear rack 105 can include a top surface or deck, side areas or sections, and has multiple bars via which objects, such as cases and brackets, can attach to the rear rack 105.

The storage assembly 100, in some embodiments, includes hard case panniers 110, 120, which are fixed proximate to the side areas of the rear rack 105 via mounting brackets 140, 150. Further, the storage assembly 100 can include a rear box 130, which attaches to the top surface or deck of the rear rack 105 via a bracket 160.

The storage assembly 100 can provide a variety of configurations of cases mounted to the rear rack 105. As depicted in FIG. 1, the assembly 100 can include two hard case panniers 110, 120 disposed proximate to the side areas of the rear rack 105 and a rear box 130 (e.g., a cooler, storage box, and so on) attached to the top of the rear rack 150. Other configurations can include (1) the two hard case panniers 110, 120; (2) the rear box 130; (3) one pannier 110 or 120 and the rear box 130; (4) one pannier 110 or 120; and so on.

Figure 2A:
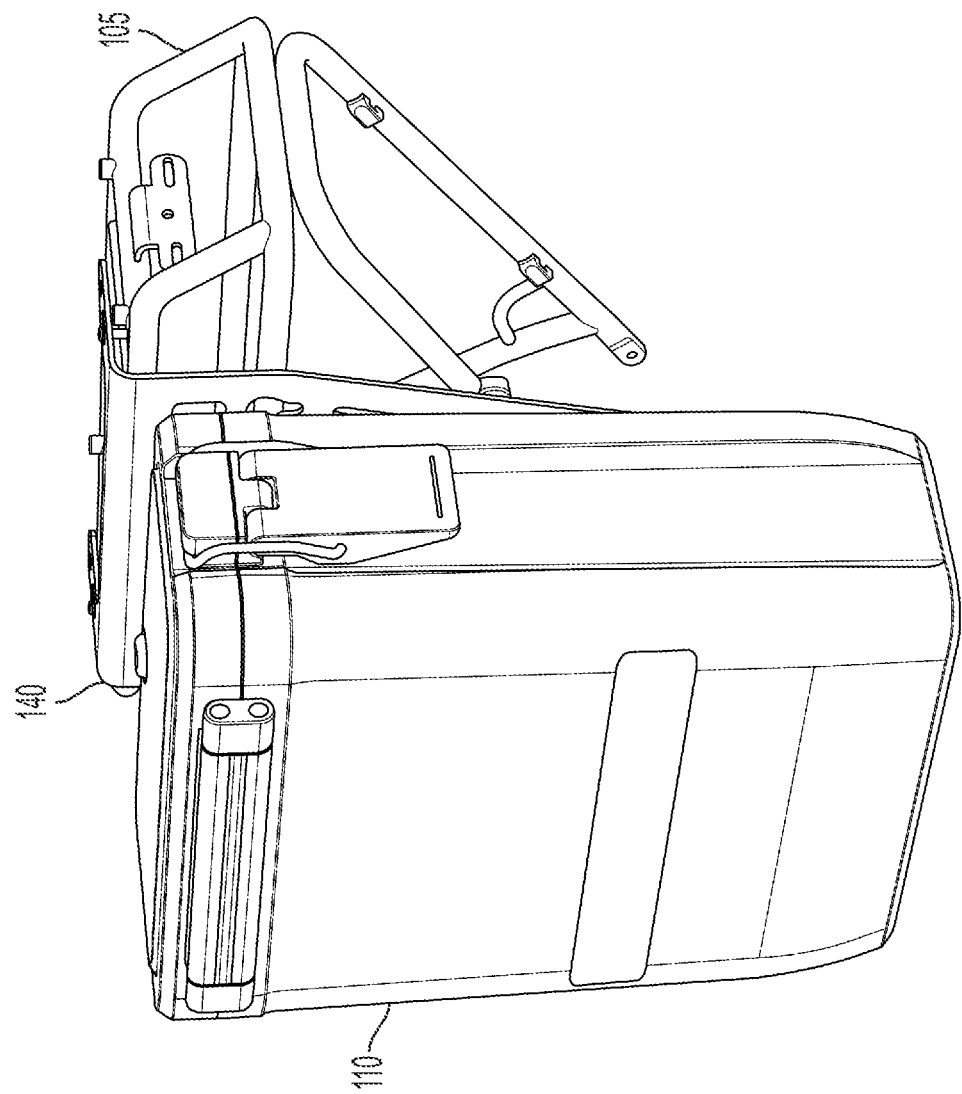
FIGS. 2A-2B are diagrams illustrating a hard case pannier attached to a rear rack of a cargo bike.
Figure 2B:
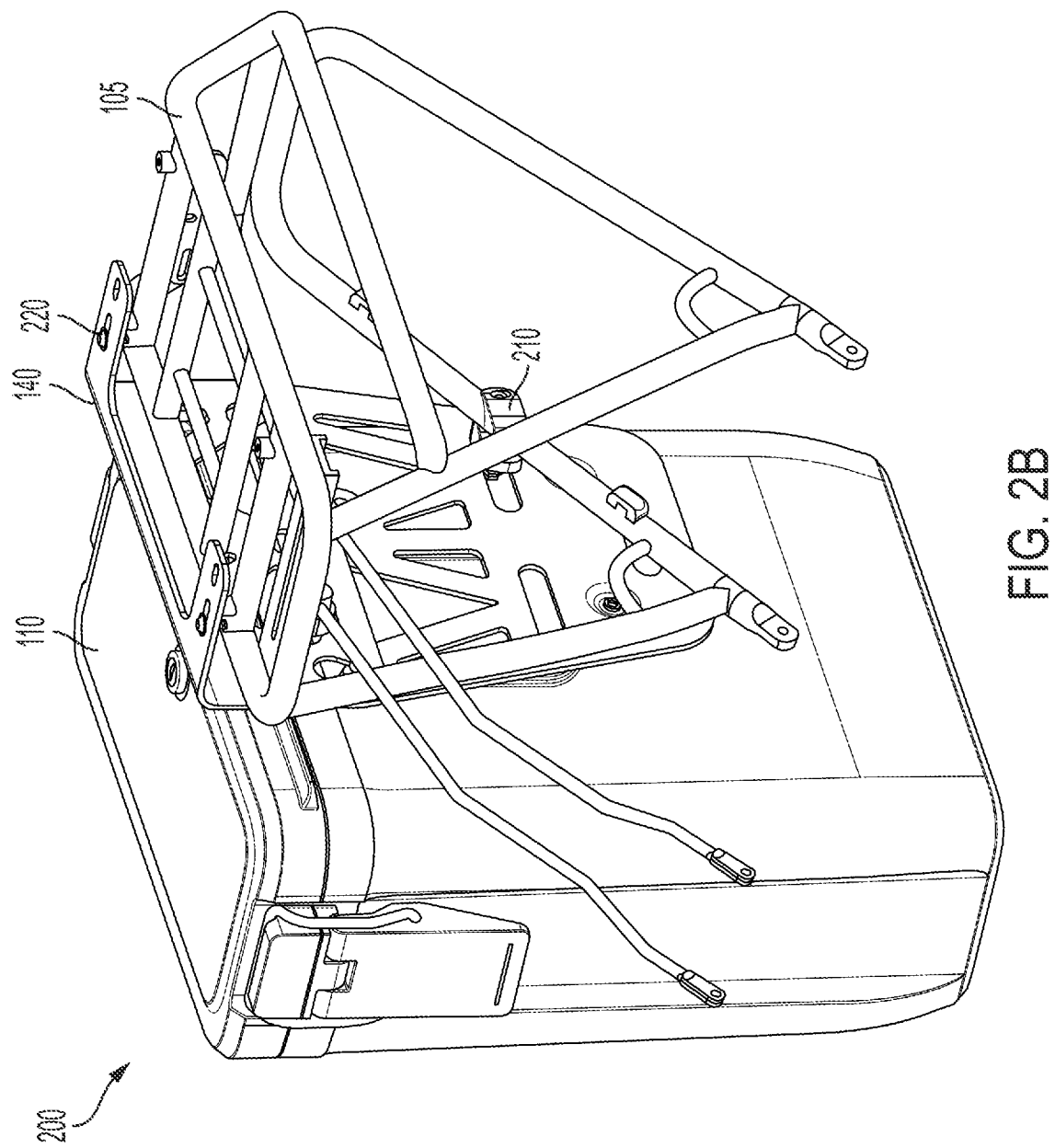

The storage assembly 100, as described herein, provides mounting brackets that facilitate the mounting or attachment of the hard cases, such as the panniers 110, 120, to the rear rack 105. FIGS. 2A-2B are diagrams 200 illustrating a hard case pannier attached to a rear rack of a cargo bike.

The hard case pannier 110 is fixed to the mounting brackets 140 (or, bracket), which is attached to the rear rack 105. The mounting bracket 140, in some cases, provides for three points of attachment of the pannier 110 to the rear rack 105. First, the mounting bracket 140 attaches to a top surface or portion of the rear rack via bolts or screws 220 (e.g., M5 screws), which provides two points of attachment. Also, the hard case pannier 110 attaches to a side bar of the rear rack 105 via a clamp 210 or other similar mechanism, which provides the third point of attachment.

Figure 3:
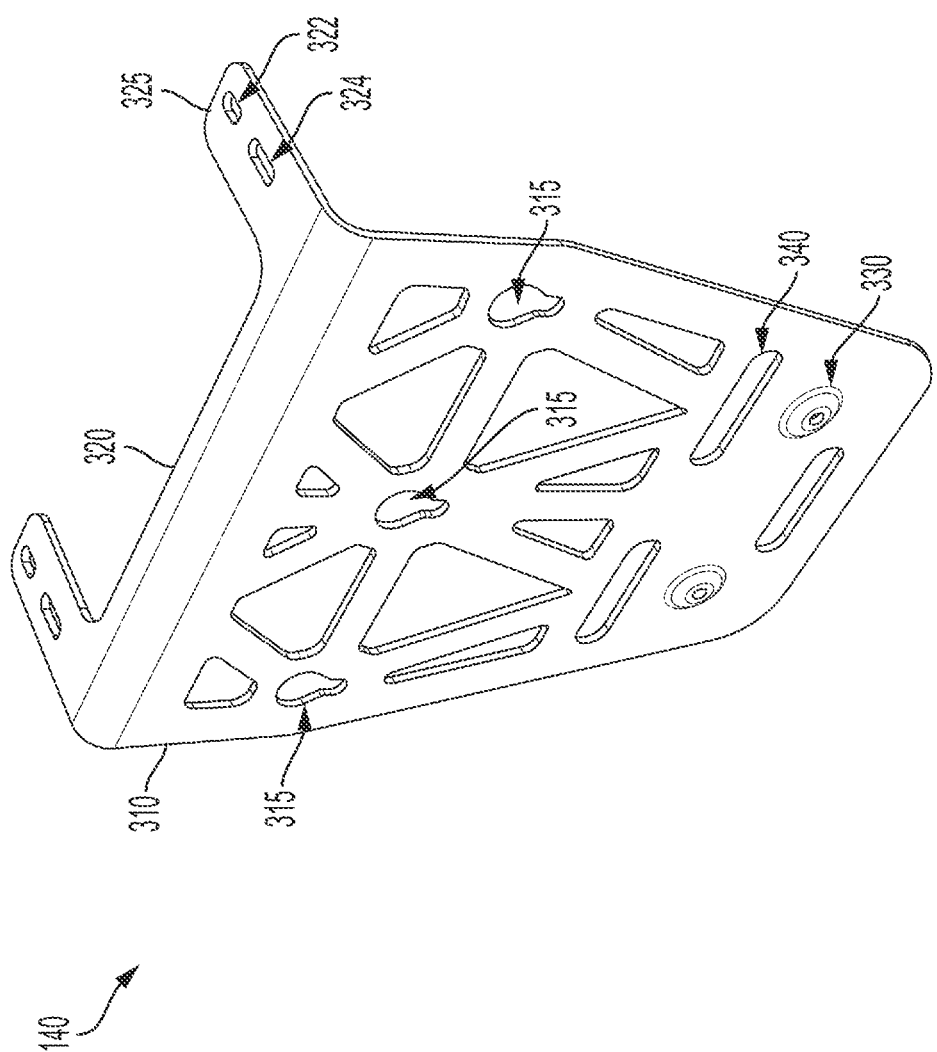
FIG. 3 is a diagram illustrating a mounting bracket that attaches the hard case pannier to the rear rack of the cargo bike.

As described herein, the mounting bracket 140, 150 is configured to fix, attached, or secure the hard case panniers 110, 120 to the rear rack 105 of the bicycle at different mounting positions or on either side of the rear rack 105. FIG. 3 is a diagram illustrating the mounting bracket 140, which attaches the hard case pannier 110 to the rear rack 105 of the cargo bike.

The mounting bracket 140, in some embodiments, includes a pannier attachment portion 310, which includes three (or more) pannier mounting openings 315 configured to receive bolts that attach a hard case pannier (e.g., pannier 110) to the pannier attachment portion 310 of the bracket 140. As depicted in FIG. 3, the pannier mounting openings 315 are disposed at a similar height within an upper area of the pannier attachment portion 310 and facilitate the hard case pannier 110 attaching to the pannier attachment portion 310 using two of the three or more pannier mounting openings 315. Further, the openings 315 can include or have a keyhole type shape or other similar shape that facilitates the entry of bolts through the openings and the attachment of the bracket 140 to the pannier 110.

For example, the bracket 140 can facilitate the hard case pannier 110 attaching to the pannier attachment portion 310 via a center opening and a front opening of the three or more pannier mounting openings 315, to position the hard case pannier closer to a rider of the bicycle (e.g., towards a front of the rear rack 105 in a forward mount position).

As another example, the bracket 140 can facilitate the hard case pannier attaching to the pannier attachment portion 310 via a center opening and a rear opening of the three or more pannier mounting openings 315, to position the hard case pannier towards a rear of the bicycle (e.g., away from a rider of the bicycle in a rear mount position).

Further, as described herein, the mounting bracket 140 can attach panniers to either side of the rear rack 105. For example, the hard case pannier attaches to the pannier attachment portion 310 via the center opening and a first opening of the three or more pannier mounting openings 315 when the hard case pannier is fixed to a left side of the bicycle in a forward mount position, and attaches to the pannier attachment portion 310 via a center opening and a second, different, opening of the three or more pannier mounting openings 315 when the hard case pannier is fixed to a right side of the bicycle in the forward mount position.

Further, the pannier attachment portion 310 includes one or more lower attachment openings 330, such as a threaded opening or hole having a threaded insert, which facilitate or receive a threaded knob or thumb screw used to secure the pannier to the bracket 140. The knob is screwed into the opening 330 within the pannier (e.g., within an internal area of the pannier 110), and thus only accessible by opening the lid, providing theft-resistance, as one would need interior access to the pannier 110 in order to remove the pannier from the bracket 140.

The pannier attachment portion 310 also includes one or more through holes 340 that facilitate a clamp (e.g., clamp 210) of the hard case pannier to extend through the bracket 140 and secure the hard case pannier to a bar of the rear rack 105, as well as the attachment of bumpers (described herein) that assist in preventing movement between the rack 140 and the pannier 110. Thus, the pannier attachment portion 310 includes various openings, holes, or other elements that facilitate the attachment and arrangement of panniers and other similar hard cases and storage articles (e.g., soft panniers) to the rear rack 105 of the bicycle.

The mounting bracket 140, in some embodiments, also includes a rack attachment portion 320, which is disposed perpendicularly to the pannier attachment portion 310 and includes multiple rack mounting openings 322, 324 that are configured to receive bolts that attach the bracket to the rear rack 105 of a bicycle.

The rack attachment portion 320 includes two attachment flanges 325, each of the attachment flanges having the multiple rack mounting openings 322, 324 configured to receive the bolts that attach the bracket 140 to the rear rack 105 of the bicycle. Depending on the size or geometry of the rear rack 105, the bracket can be mounted via the openings 324 or the openings 322.

In some cases, the rack attachment portion is disposed in a two-dimensional plane parallel and proximate to a top portion or surface of the rear rack 105, where the pannier attachment portion 310 is disposed in a two-dimensional plane parallel and proximate to a side portion of the rear rack 105. As shown in FIG. 3, the mounting bracket 140 is a single piece construction (e.g., plastic, metal) that bends to form the two portions of the bracket 140.

Thus, as described herein, the mounting bracket 140 (and, similarly, bracket 150) facilitates the attachment (and subsequent removal) of the hard case panniers 110, 120) to the rear rack 105 of a cargo bicycle. FIGS. 4A-4D are diagrams 400 depicting the hard case pannier 110 fixed or attached to the mounting bracket 140.

The pannier 110 is removably fixed to the mounting bracket 140 via bolts, posts, or studs 430 that secure the pannier 110 to the mounting bracket 140 via the pannier mounting openings 315. The bolts 430 can include a mushroom head style geometry, which, when fixed within the openings 315, securely fix the pannier 110 to the bracket 140.

The hard case pannier 110 also includes latches 415 and a hinge 460 that enable the pannier to be opened and closed, and a lock 410 or locking mechanism that secures the pannier 110 and any contents stored inside the pannier 110. In some cases, the hinge 460 is a hinge assembly having multiple hinges, such as two hinges, one at each end of the pannier 110, that form the hinge 460.

Further, the pannier 110 is fixed to the bracket 140 via the thumb screws 470, which secure the pannier 110 to the bracket 140 via the threaded openings 330. Thus, when the pannier 110 is locked, the thumb screws 470 are inaccessible, and the pannier 110 cannot be removed (or, easily removed) from the bracket 140. However, when opened, the rider can utilize the thumb screws 470 to remove the pannier 110 from the mounting bracket 140 (without removing the bracket from the rear rack 105).

The mounting bracket 140 also facilitates the extension of the clamp 210 from the pannier 110 to the rear rack 105, which assists in fixing the pannier 110 to the rear rack 105. The mounting bracket 140, as described herein, includes openings or holes 340 which allow the clamp to pass through the bracket 140. The clamp can be opened and closed around a bar of the rear rack 105 via an associated thumb screw 450.

Figure 4A:
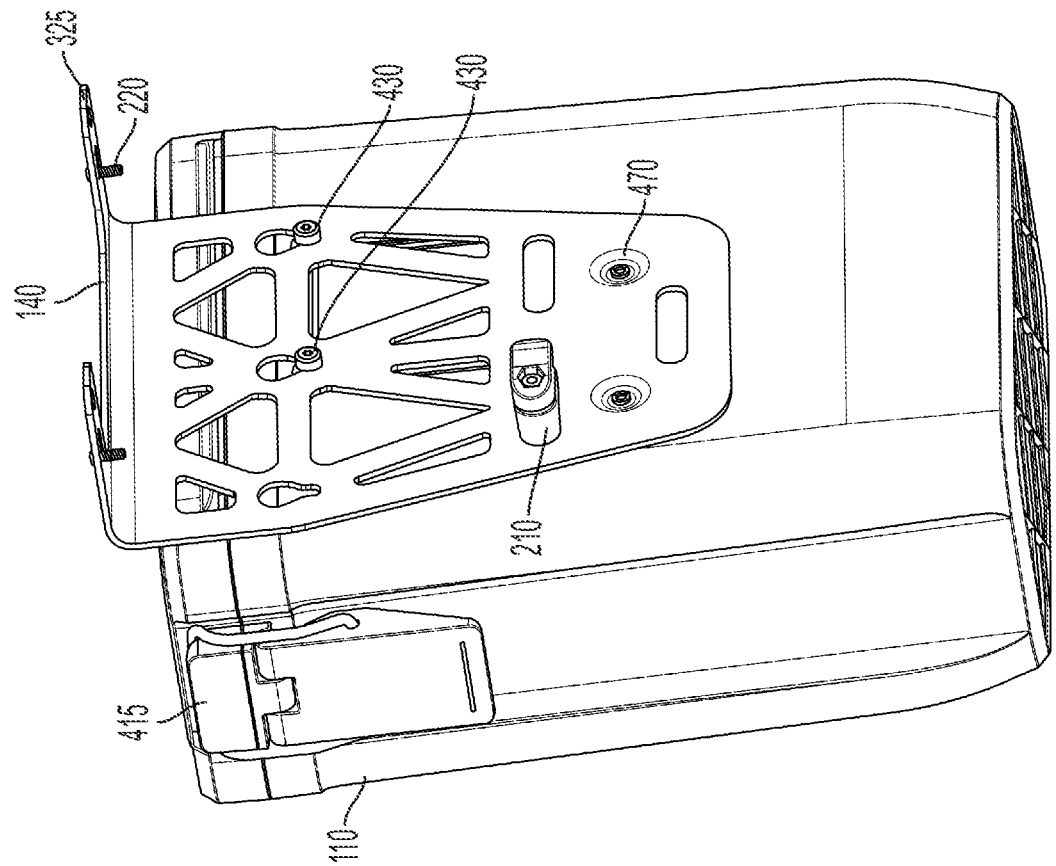
FIGS. 4A-4E are diagrams illustrating the hard case pannier fixed to the mounting bracket.
Figure 4B:
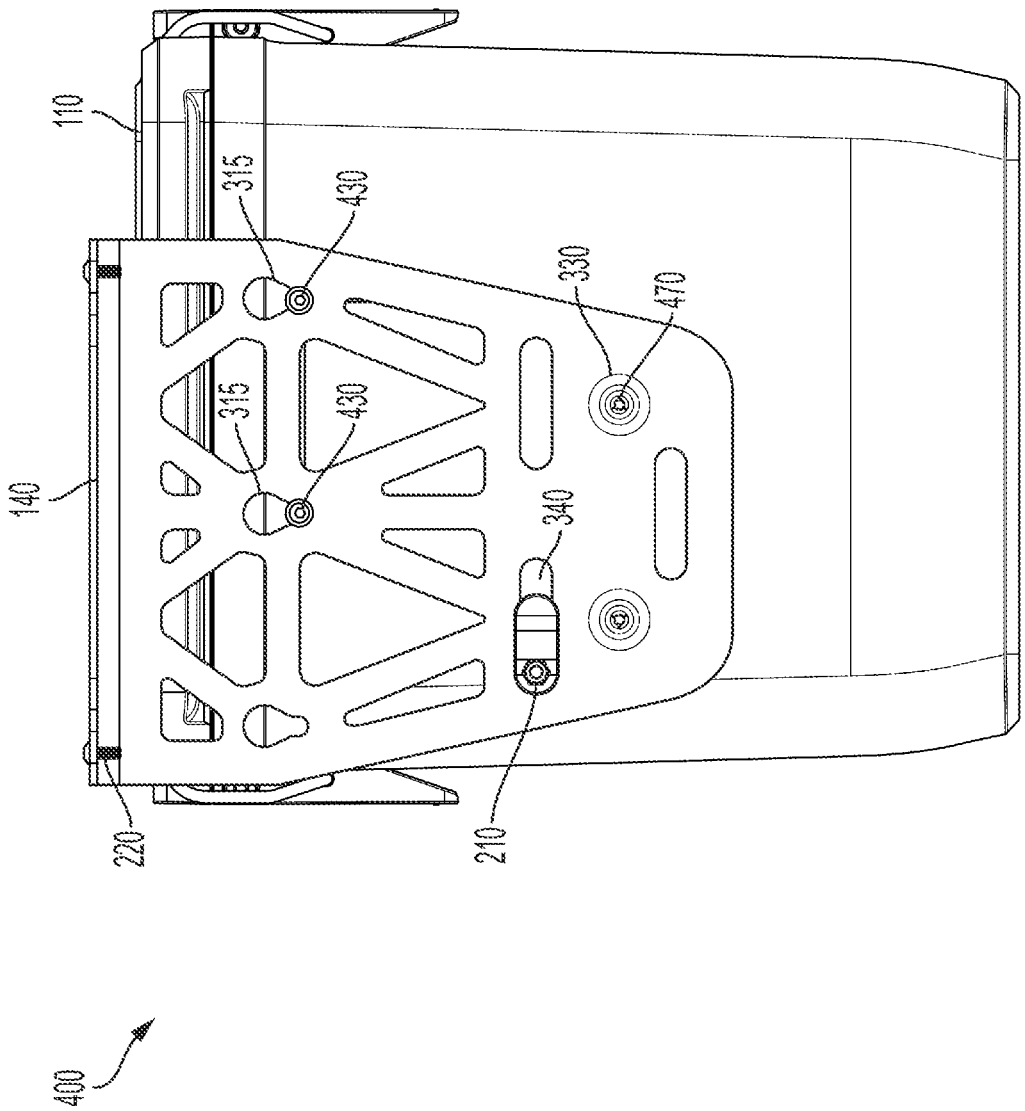
Figure 4C:
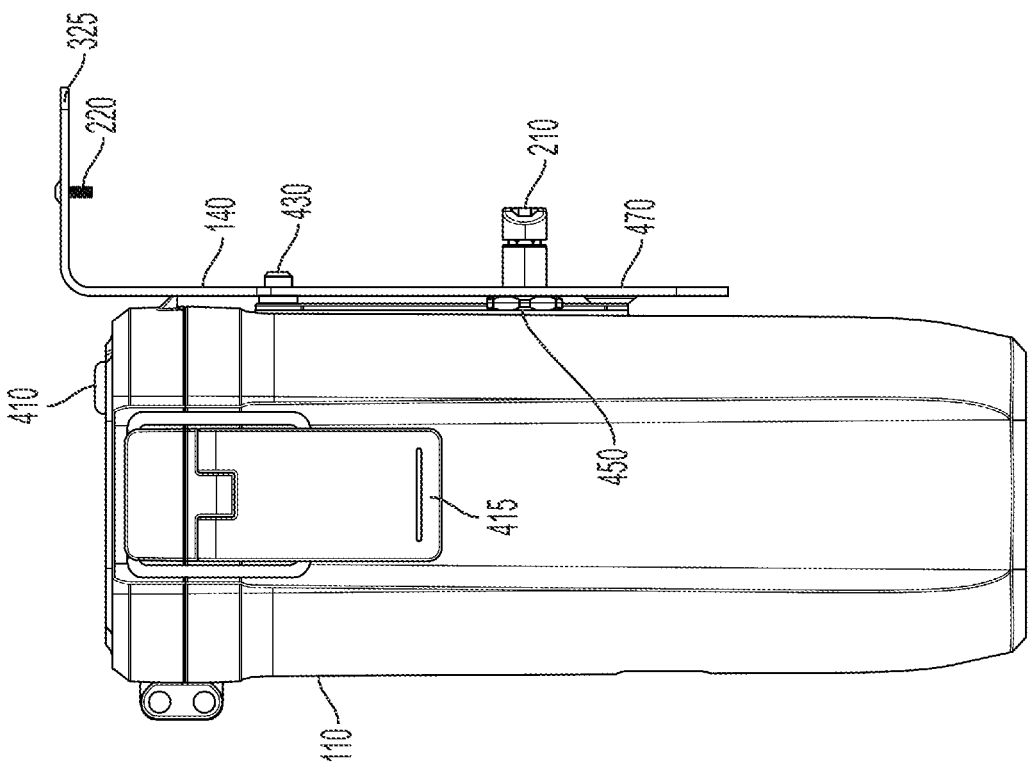
Figure 4D:
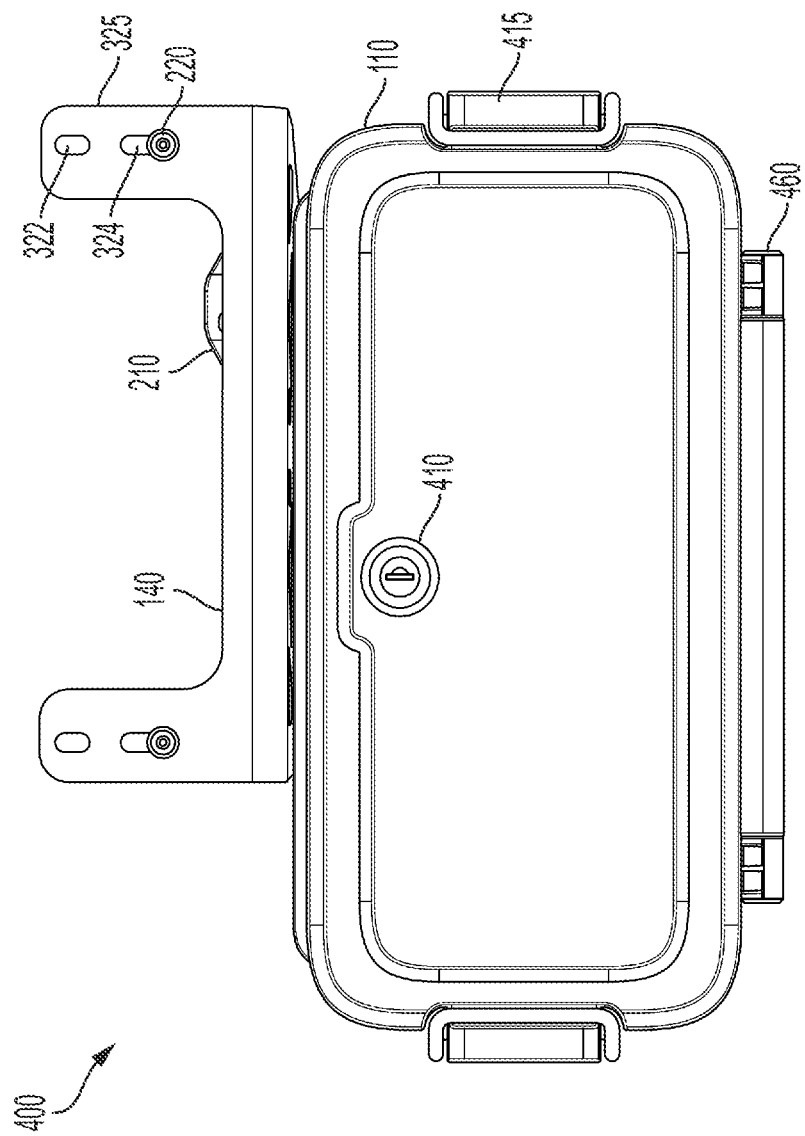
Figure 4E:
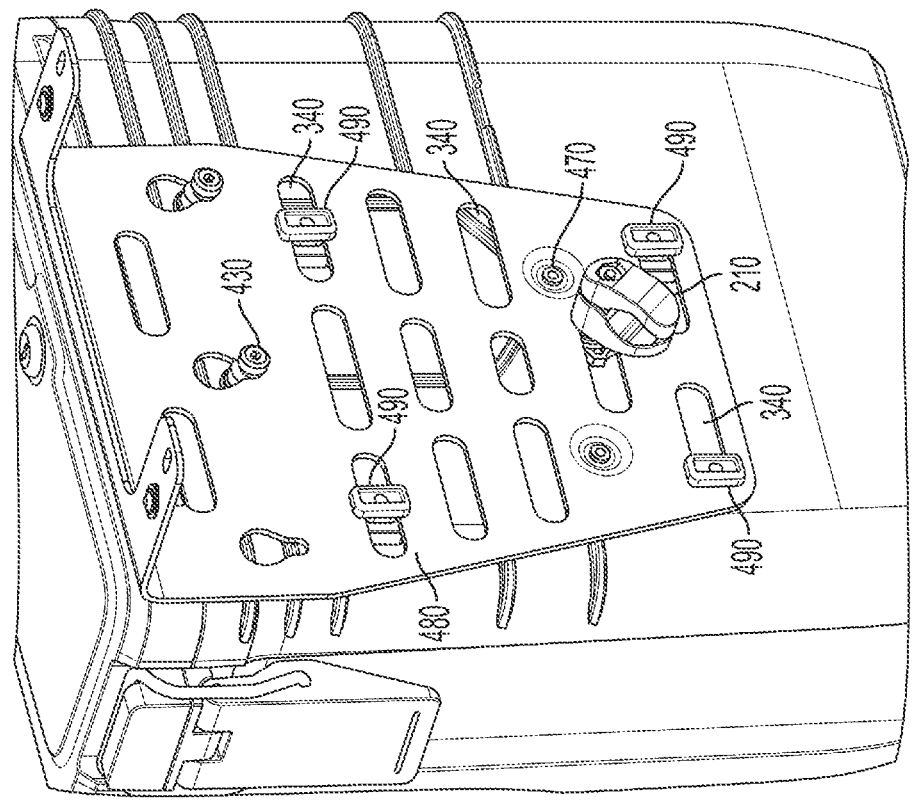

FIG. 4E is a diagram 475 depicting an alternative mounting bracket 480 that facilitates the inclusion of bumpers 490 between the bracket and the pannier. The bumpers 490 can be disposed or placed at or within various holes 340 or attachment points on the bracket. For example, the bumpers, which can be elastomeric bumpers, can include two upper bumpers and two lower bumpers. However, the pannier can be attached or placed on the bracket 480 using fewer or more bumpers located at any of the openings 340 of the bracket that facilitate their placement or attachment.

In some cases, using both the bumpers 490 and certain mounting posts 430 (e.g., mushroom head style posts), enables a more secure attachment of the pannier 110 to a bracket. For example, the two upper bumpers can provide interference to an outer wall of the pannier 110, which pulls the pannier 110 against the mounting bracket.

Thus, the storage assembly 100 enables the pannier 110 to be securely attached to the mounting bracket 140, but also removable by a user without tools or other additional accessories. Further, the mounting bracket 140 facilitates the mounting and removal of the pannier 110 to/from the rear rack 105 at different locations or areas, among other benefits.

For example, the assembly 100 facilitates a method of attaching a pannier to a rear rack of a cargo bicycle. The method can include attaching the pannier to a mounting bracket via thumb screws accessible via an internal area of the pannier, fixing the mounting bracket to a top surface of the rear rack of the cargo bicycle, extending a clamp of the pannier through an opening of the mounting bracket, and attaching the pannier to a side bar of the rear rack via the clamp extended through the opening of the mounting bracket.

Figure 5A:
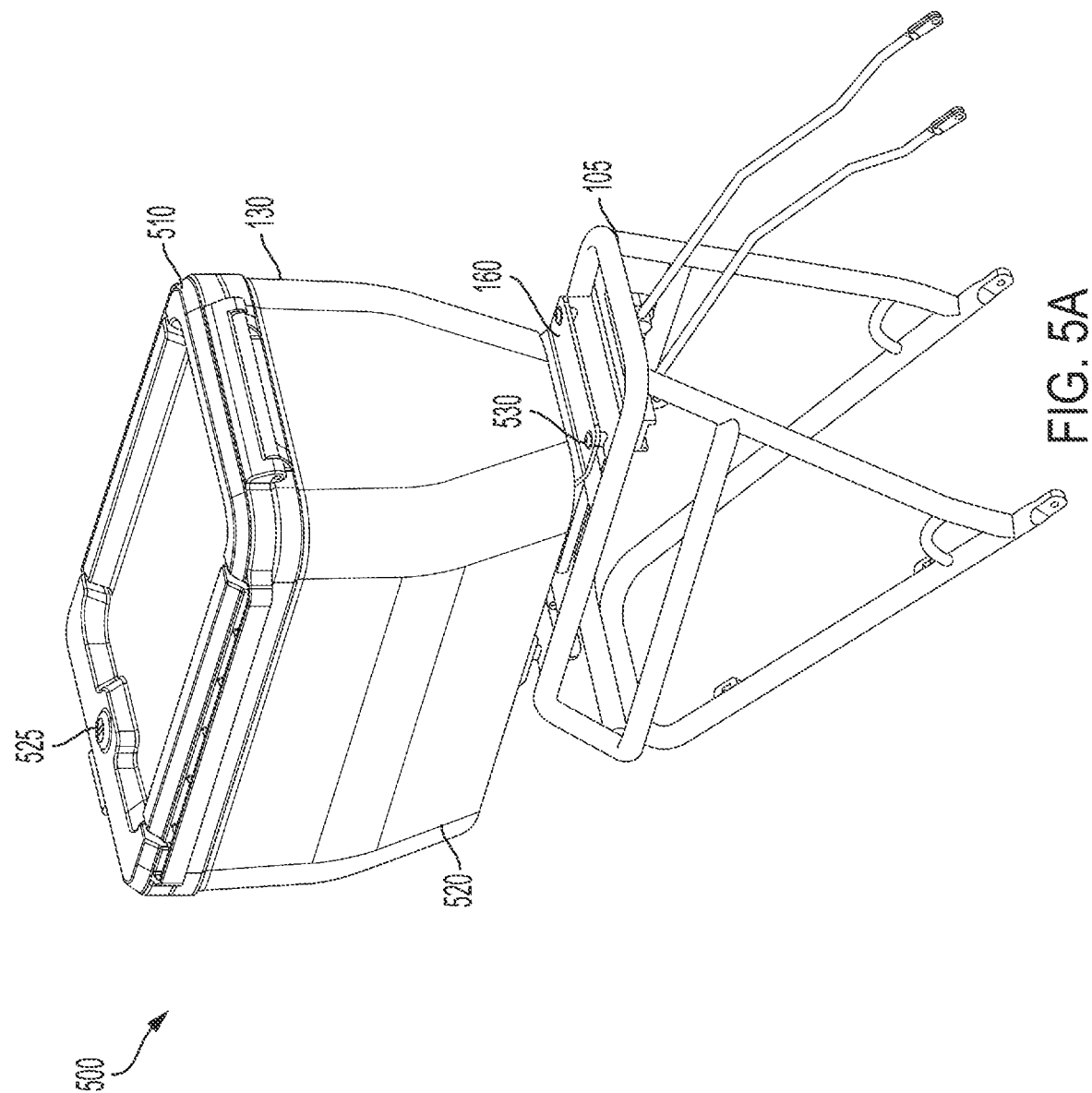
FIGS. 5A-5B are diagrams illustrating a rear box mounted to the rear rack of a cargo bike.
Figure 5B:
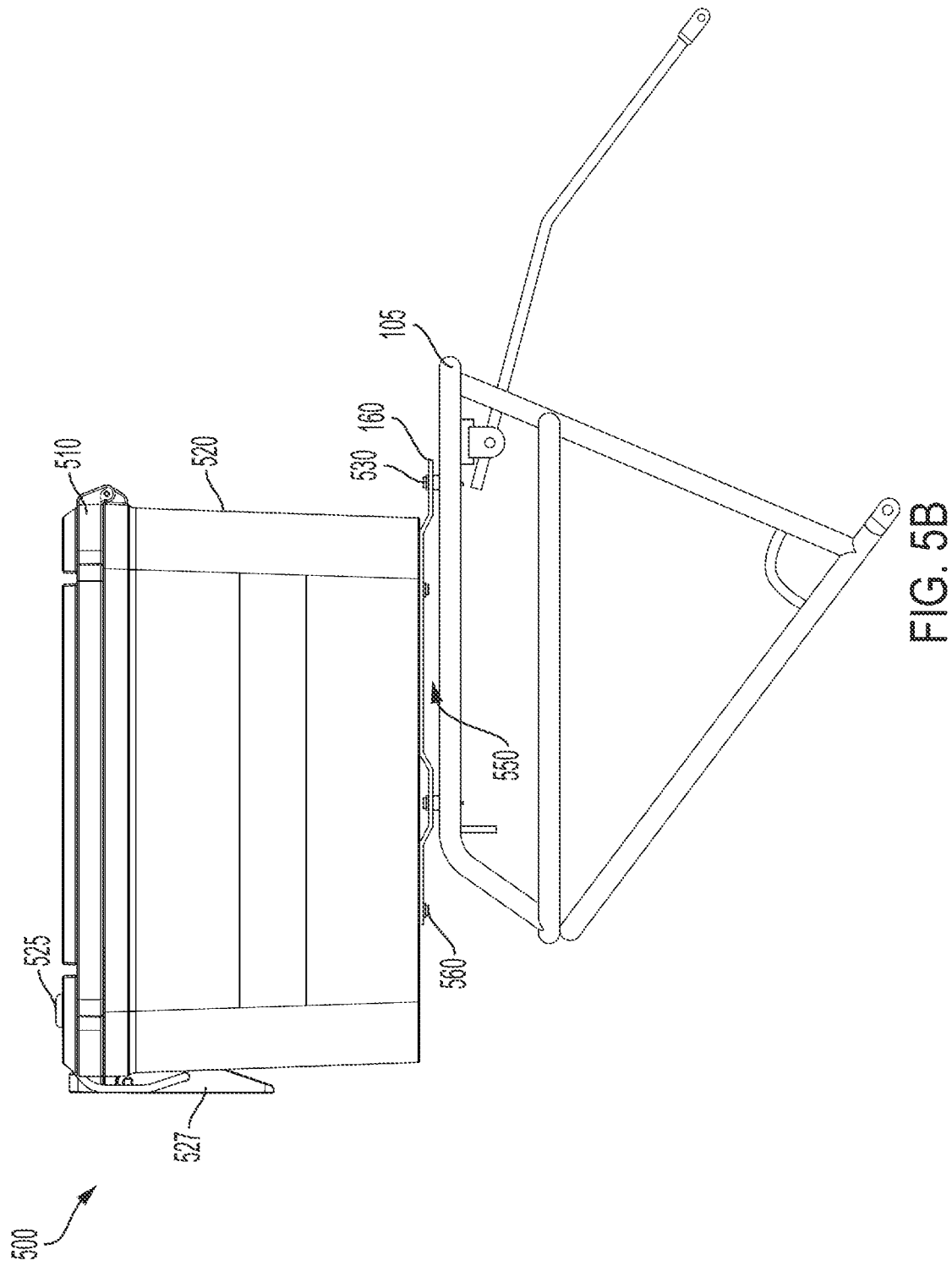

In some embodiments, the storage assembly also includes a rear box or rear storage cases, such as a cooler, storage container, hard case box, and so on. FIGS. 5A-5B are diagrams 500 illustrating the rear box 130 mounted to the rear rack 105 of a cargo bike.

The rear box 130, or rear storage box, includes a top portion or lid 510 and a main portion or housing 520 configured to securely store cargo for a user of the bicycle. The rear box 130 can include a lock 525 or locking mechanism that locks the lid 510 to the housing 520, and a latch 527 that facilities the opening and closing of the lid 510.

The mounting bracket 160, such as a box mounting bracket, mounts, attaches, or fixes the rear storage box 130 to a top surface of the rear rack 105 of the cargo bicycle. For example, screws or bolts 530 can fix the mounting bracket 160 to the rear rack, and other bolts or screws (e.g., thumb screws) 560 can fix the rear box 130 to the bracket 160. The bracket 160 can have a shape that provides a gap 550 between the bracket 160 and the rack 105, which allows the box to be stored in a rear position (e.g., as shown in FIG. 5B) or a forward position (e.g., closer to the rider) on the rear rack 105.

As described herein, in some embodiments, the storage assembly 100 includes the rear box 160 and one (or both) of the hard case panniers 110, 120. For example, the assembly 100 can include the rear storage box 130, the box mounting bracket 160, which is configured to mount the rear storage box 130 to a top surface of the rear rack 105 of the cargo bicycle, the hard case pannier 110, and the pannier mounting bracket 140, which is configured to mount the hard case pannier 110 to a side of the rear rack 105 of the cargo bicycle.

Figure 6A:
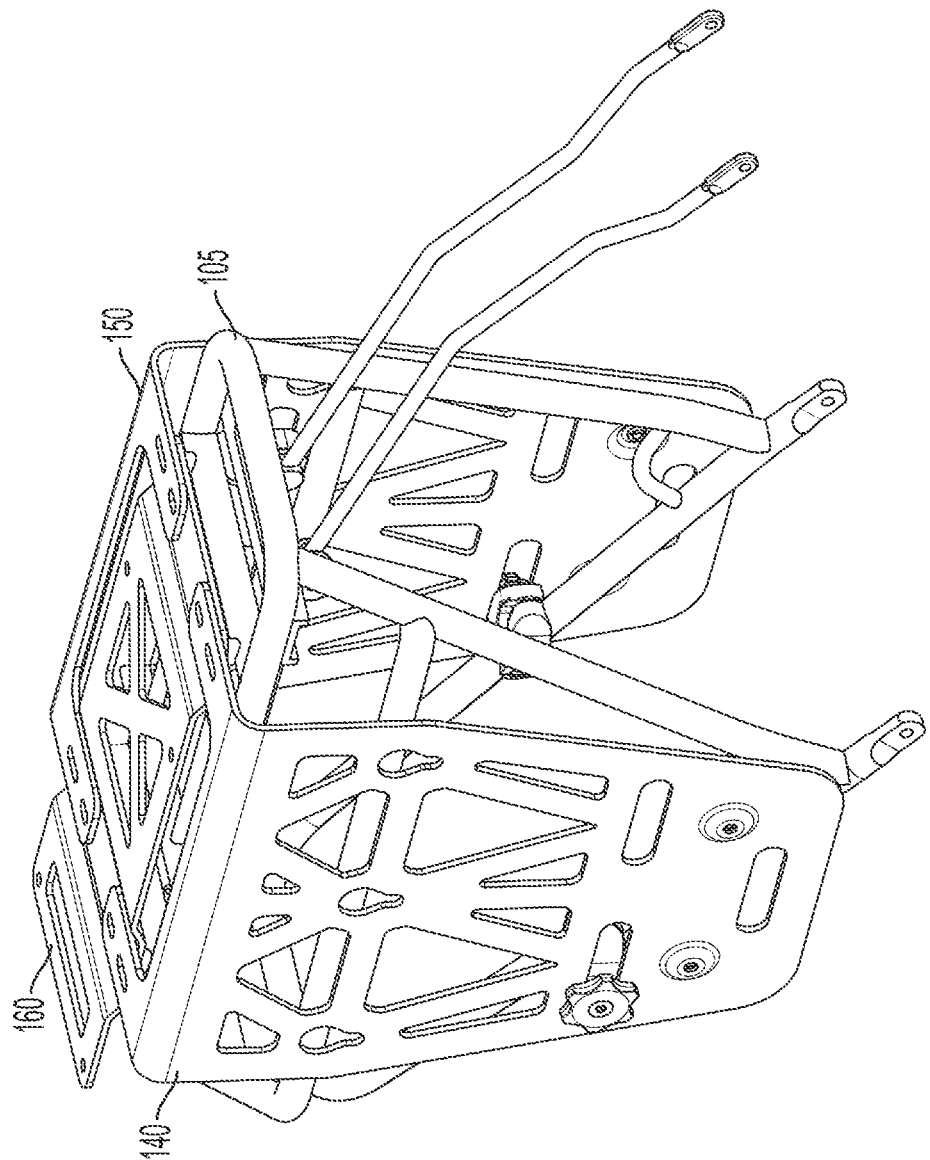
FIGS. 6A-6B are diagrams illustrating multiple brackets attached to the rear rack of a cargo bike.
Figure 6B:
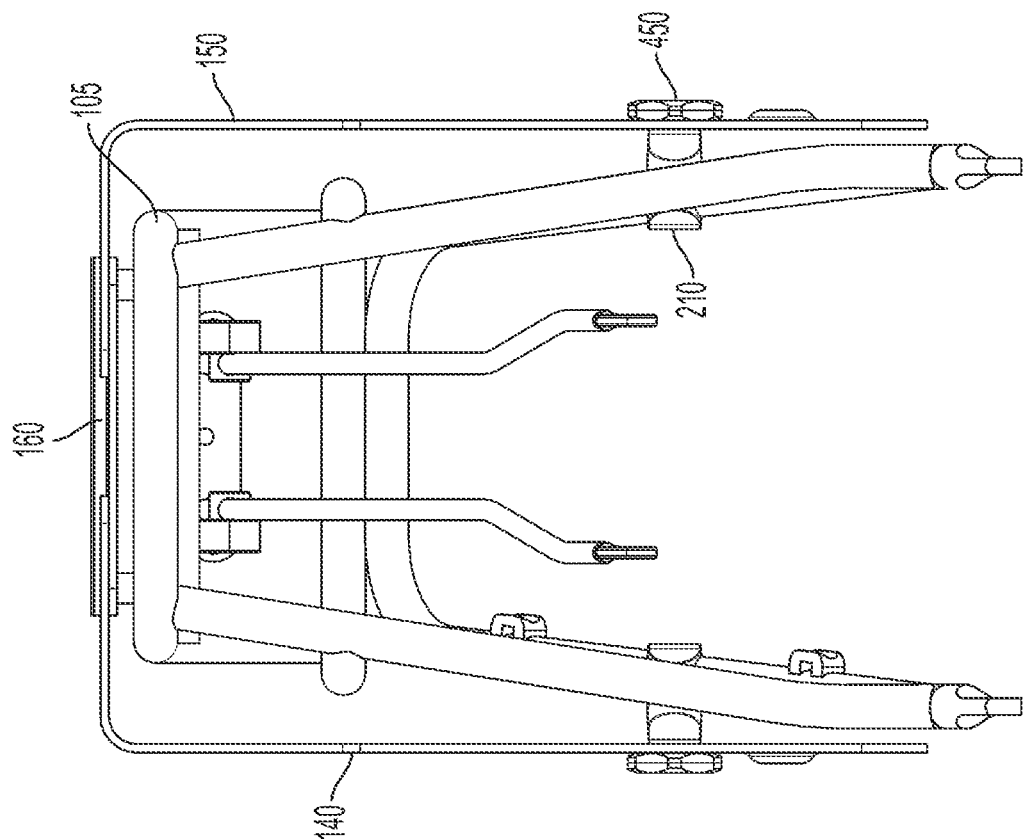

FIGS. 6A-6B are diagrams 600 illustrating multiple brackets attached to the rear rack of a cargo bike. The pannier mounting brackets 140, 150 attach to the top surface of the rear rack 105 and are placed or disposed on top of the box mounting bracket 160, which is attached to the top surface of the rear rack 105. Thus, the box mounting bracket 160 is configured to mount the rear storage box 130 to the top surface of the rear rack 105, and the pannier mounting bracket is configured to mount the hard case pannier 110 to a side of the rear rack 105 of the cargo bicycle by also attaching to the top surface of the rear rack 105 of the cargo bicycle.

Such a configuration enables the rear rack 105 to facilitate attachment of some or all the hard cases of the storage assembly 100 described herein in various configurations or assemblies, among other benefits.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or", in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the electric bike and bike frame may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

From the foregoing, it will be appreciated that specific embodiments have been described herein for purposes of illustration, but that various modifications may be made without deviating from the spirit and scope of the embodiments. Accordingly, the embodiments are not limited except as by the appended claims.

What is claimed is:

1. A storage assembly for a cargo bicycle, the storage assembly including:
    a rear storage box;
    a box mounting bracket configured to mount the rear storage box to a top surface of a rear rack of the cargo bicycle;
    a hard case pannier; and
    a pannier mounting bracket configured to mount the hard case pannier to a side of the rear rack of the cargo bicycle, wherein the pannier mounting bracket includes:
    a rack attachment portion that is disposed on top of the box mounting bracket and multiple rack mounting openings via which bolts that attach the pannier mounting bracket to the top surface of the rear rack of the cargo bicycle can be extended.

2. The storage assembly of claim 1, wherein the pannier mounting bracket includes a pannier attachment portion that includes three or more pannier mounting openings configured to receive bolts that attach the hard case pannier to the pannier attachment portion of the pannier mounting bracket.

3. The storage assembly of claim 1, wherein the pannier mounting bracket includes a pannier attachment portion that includes:
    three or more pannier mounting openings configured to receive bolts that attach the hard case pannier to the pannier attachment portion of the pannier mounting bracket; and
    one or more through holes that facilitate a clamp of the hard case pannier to extend through the pannier mounting bracket and secure the hard case pannier to a bar of the rear rack.

4. The storage assembly of claim 1, further comprising:
    a second pannier mounting bracket configured to mount a second hard case pannier to a second side of the rear rack of the cargo bicycle,
    wherein the second pannier mounting bracket includes a second rack attachment portion that is disposed on top of the box mounting bracket, and
    wherein the second rack attachment portion includes multiple rack mounting openings configured to receive bolts that attach the second pannier mounting bracket to the top surface of the rear rack of the cargo bicycle.

5. The storage assembly of claim 1, wherein the pannier mounting bracket is configured to mount the hard case pannier to either side of the rear rack of the cargo bicycle.

6. The storage assembly of claim 1, wherein the box mounting bracket is configured to mount the rear storage box to the top surface of the rear rack of the cargo bicycle at a first position closer to a rider of the cargo bicycle or a second position closer to a rear of the cargo bicycle.

7. The storage assembly of claim 1, wherein the rear storage box is removably fixed to the box mounting bracket via thumb screws that are accessible via an internal area of the box mounting bracket.

8. The storage assembly of claim 1, wherein the hard case pannier is removably fixed to the pannier mounting bracket via thumb screws that are accessible via an internal area of the hard case pannier.

9. A method of attaching a pannier to a rear rack of a cargo bicycle, the method comprising:
    attaching the pannier to a mounting bracket via multiple bolts and at least one thumb screw that is only accessible via an internal area of the pannier;
    fixing the mounting bracket to a top surface of the rear rack of the cargo bicycle;
    extending a clamp of the pannier through an opening of the mounting bracket; and
    attaching the pannier to a side bar of the rear rack via the clamp extended through the opening of the mounting bracket.

10. The method of claim 9, wherein the mounting bracket includes three or more pannier mounting openings that are disposed at a similar height within an upper area of the mounting bracket, the method comprising:
    attaching the pannier to the mounting bracket via the multiple bolt using two of the three or more pannier mounting openings.

11. The method of claim 9, wherein fixing the mounting bracket to a top surface of the rear rack of the cargo bicycle includes positioning the pannier proximate to a side portion of the rear rack.

* * * * *